United States Patent
Hatcher, Jr. et al.

(10) Patent No.: US 9,618,384 B2
(45) Date of Patent: Apr. 11, 2017

(54) ACOUSTIC MEASUREMENT SYSTEM FOR DETECTING TURBINE BLADE LOCKUP

(71) Applicant: Siemens Energy, Inc., Orlando, FL (US)

(72) Inventors: Clifford Hatcher, Jr., Orlando, FL (US); Forrest R. Ruhge, Orlando, FL (US); John E. Junkin, New Smyrna Beach, FL (US); Mark L. Kamphaus, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 248 days.

(21) Appl. No.: 14/569,840

(22) Filed: Dec. 15, 2014

(65) Prior Publication Data

US 2016/0169733 A1 Jun. 16, 2016

(51) Int. Cl.
*G01H 1/00* (2006.01)
*F01D 21/00* (2006.01)

(52) U.S. Cl.
CPC ........... *G01H 1/006* (2013.01); *F01D 21/003* (2013.01)

(58) Field of Classification Search
CPC .............................. G01H 1/006; F01D 21/003
USPC .......................................................... 73/660
See application file for complete search history.

(56) References Cited

U.S. PATENT DOCUMENTS

| | | | | | |
|---|---|---|---|---|---|
| 4,096,615 A | * | 6/1978 | Cross | ................... | B23K 35/304 228/175 |
| 4,335,600 A | * | 6/1982 | Wu | .......................... | G07C 3/00 73/112.02 |
| 5,152,172 A | * | 10/1992 | Leon | ....................... | G01H 1/006 310/40 R |
| 5,471,880 A | * | 12/1995 | Lang | ....................... | G01H 1/006 702/56 |
| 6,082,198 A | * | 7/2000 | Sabourin | ............... | G01N 29/262 73/628 |
| 6,132,383 A | * | 10/2000 | Chesney | ................. | A61B 5/022 600/485 |
| 6,192,530 B1 | * | 2/2001 | Dai | ........................... | E03C 1/05 4/623 |
| 7,416,393 B2 | * | 8/2008 | Richter | ................ | B23K 11/006 219/98 |
| 2014/0271206 A1 | * | 9/2014 | Marasco | ............... | F01D 11/006 416/193 A |

(Continued)

FOREIGN PATENT DOCUMENTS

CN 103018334 * 6/2015

*Primary Examiner* — J M Saint Surin

(57) ABSTRACT

An acoustic measurement system for detecting locked blade assemblies in a gas turbine having a plurality of blade assemblies. The system includes at least one acoustic sensor for detecting acoustic energy generated as a result of movement of the blade assemblies during a turning gear operation. In addition, the system includes a housing for holding the acoustic sensor, wherein the housing is mounted to an outer diffuser of the gas turbine. The housing also includes a rotatable joint for enabling rotation of the acoustic sensor. Further, the system includes a data acquisition unit that detects an absence of acoustic energy wherein the absence of acoustic energy is indicative of locked blade assemblies. The blade assemblies are locked due to wedging of a sealing pin between the blade assemblies. The acoustic energy is detected in a frequency range of approximately 0.9 kHz to 10 kHz.

20 Claims, 6 Drawing Sheets

(56) References Cited

U.S. PATENT DOCUMENTS

2016/0177776 A1\* 6/2016 Ruhge .................. F01D 11/006
                                                    73/112.01

\* cited by examiner

ACOUSTIC MEASUREMENT SYSTEM FOR DETECTING TURBINE BLADE LOCKUP

FIELD OF THE INVENTION

The invention relates to detection of locked blade assemblies in a gas turbine, and more particularly, to an acoustic measurement system for detecting the locked blade assemblies wherein the system includes at least one acoustic sensor, a housing that enables rotation of the acoustic sensor and a data acquisition unit that detects an absence of acoustic energy wherein the absence of acoustic energy is indicative of locked blade assemblies.

BACKGROUND OF THE INVENTION

In various multistage turbomachines used for energy conversion, such as gas turbines, a fluid is used to produce rotational motion. Referring to FIG. 1, an axial flow gas turbine 10 includes a compressor section 12, a combustion section 14 and a turbine section 16 arranged along a horizontal center axis 17. The compressor section 14 provides a compressed air flow to the combustion section 14 where the air is mixed with a fuel, such as natural gas, and ignited to create a hot working gas. The turbine section 16 includes a plurality of blade assemblies 20 arranged in a plurality of rows. The hot gas expands through the turbine section 16 where it is directed across the rows of blade assemblies 20 by associated stationary vanes 22. The blade assemblies 20 are ultimately attached to a shaft that is rotatable about the center axis 17. As the hot gas passes through the turbine section 16, it causes the blade assemblies 20 and thus the shaft to rotate, thereby providing mechanical work. Each row of blade assemblies 20 and associated vanes 22 form a stage. In particular, the turbine section 16 may include four rows of blade assemblies 20 and associated vanes 22 to form four stages. The gas turbine 10 further includes an exhaust cylinder section 18 located adjacent the turbine section 16 and an outer diffuser section 24 located adjacent the exhaust cylinder section 18.

Many gas turbines may utilize a portion of the compressed air generated by the compressor section 12 as a cooling fluid for cooling hot components of the combustion 14 and turbine sections 16 of the gas turbine 10. In one type of cooling system design known as a closed loop cooling system, a seal pin arrangement is used to form a seal between adjacent rotating blade assemblies 20. FIG. 2 illustrates an exemplary rotatable blade assembly 20 used in the gas turbine 10. Blade assembly 20 includes a root section 26 that is attached to a rotor and a platform section 28 that extends from the root section 26. An airfoil or turbine blade 30 extends from the platform 28 on an opposite side from the root section 26. The blade 30 extracts heat and pressure energy from the hot gas as it passes over the blade assembly 20 and converts the energy into mechanical energy by rotating the shaft.

The platform 28 is sealed and damped against a corresponding blade platform of an adjoining blade assembly 20 by seal pins 32 and 34. The pins 32 and 34 are positioned in corresponding pin slots 36 and 38 formed into a surface 40 of the platform 28. The pin slots 36 and 38 are arranged such that centrifugal force generated by rotation about the center axis 17 loads the pins 32 and 34. This forces the pins 32 and 34 out of a resting position in the pin slots 36 and 38 so that the pins 32 and 34 are urged against a corresponding surface of a blade platform of an adjoining blade assembly 20, thereby forming a seal and damping structure.

SUMMARY OF INVENTION

An acoustic measurement system is disclosed for detecting locked blade assemblies in a gas turbine having a plurality of blade assemblies. The system includes at least one acoustic sensor for detecting acoustic energy generated as a result of movement of the blade assemblies during a turning gear operation. Movement of the blades generates a blade movement sound such as a clicking sound. The system also includes a housing for holding the acoustic sensor, wherein the housing is mounted to an outer diffuser of the gas turbine. The housing also includes a rotatable joint for enabling rotation of the acoustic sensor. Further, the system includes a data acquisition unit that detects an absence of acoustic energy wherein the absence of acoustic energy is indicative of locked blade assemblies. In particular, the blade assemblies are locked due to wedging of a sealing pin between the blade assemblies. The acoustic energy is detected in a frequency range of approximately 0.9 kHz to 10 kHz. In addition, the acoustic sensor may be located in a preexisting thermocouple port that extends through an exhaust cylinder section of the gas turbine.

Those skilled in the art may apply the respective features of the present disclosure jointly or severally in any combination or sub-combination.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
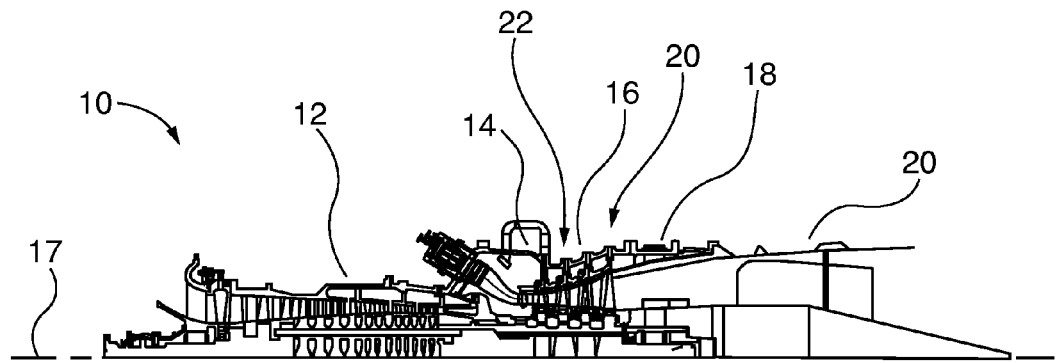
FIG. 1 is a partial view an axial flow gas turbine.
Figure 2:
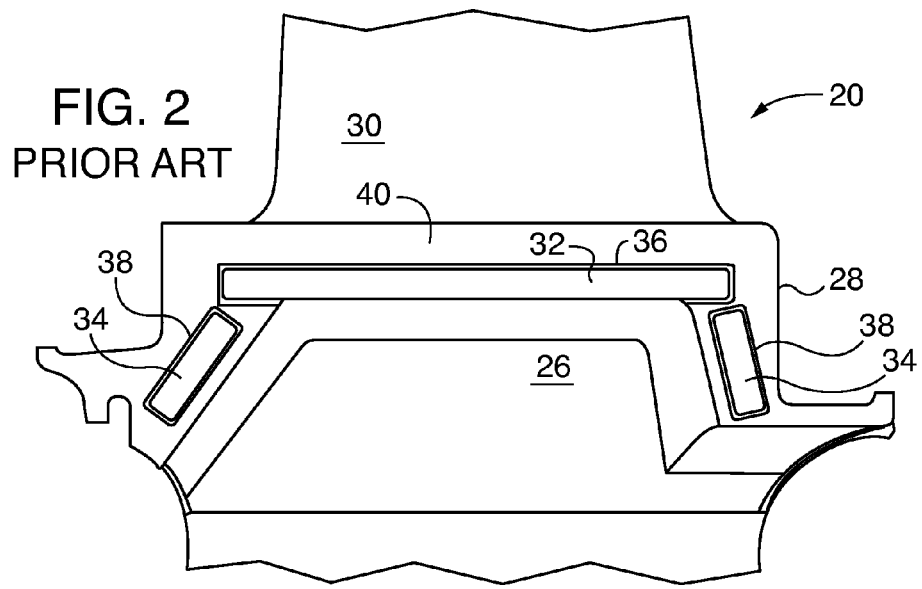
FIG. 2 is a view of an exemplary rotatable blade assembly used in the gas turbine.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

It has been found by the inventors herein that at least one seal pin 32, 34 associated with at least one blade assembly 20 of the turbine section 16 may migrate from an associated pin slot 36, 38 and become undesirably wedged between adjoining platforms 28. Pin migration may occur during a known turning gear operation wherein a turning gear mechanism is used to slowly rotate a turbine shaft prior to startup of a cold gas turbine 10 or after shutdown of the gas turbine 10 to remove or inhibit sagging of the shaft. During a turning gear operation, the shaft rotates at a turning gear speed (for example, approximately 3 to 5 rpm) that is substantially less than normal turbine operating speed (for example, approximately 3600 rpm). This results in the generation of a substantially reduced centrifugal force that in turn sufficiently unloads the seal pins 32, 34 such that at least one pin 32, 34 becomes loose, migrates out of its associated slot and ultimately becomes wedged in between adjoining platforms 28. When a seal pin 32, 34 is wedged between adjoining platforms 28, an operational frequency and/or vibration characteristic of the blade 30 is changed that results in an undesirable increase in mechanical stress exerted on the blade 30 at a location near the platform 28.

The unloading of the pins 32, 34 due to reduced rotational speed during a turning gear operation results in each blade assembly 20 being loosely attached to its corresponding rotor. As a result, each blade assembly 20 is able to shift or move as it is rotated about the center axis 17. The shifting or movement of each blade assembly 20 results in the generation, by each blade assembly 20, of a blade movement sound having a distinctive acoustic signature or energy. For example, the blade movement sound may be similar to a clicking sound. The blade movement sounds occur at a substantially consistent angular position as the blade assemblies 20 rotate about the center axis 17 at turning gear speed. In particular, it has been found that the blade movement sound occurs when each blade assembly 20 is located in a substantially vertically upward angular position relative to the center axis 17 (i.e. corresponding to approximately 12 o'clock on a 12 hour clock).

Figure 3:
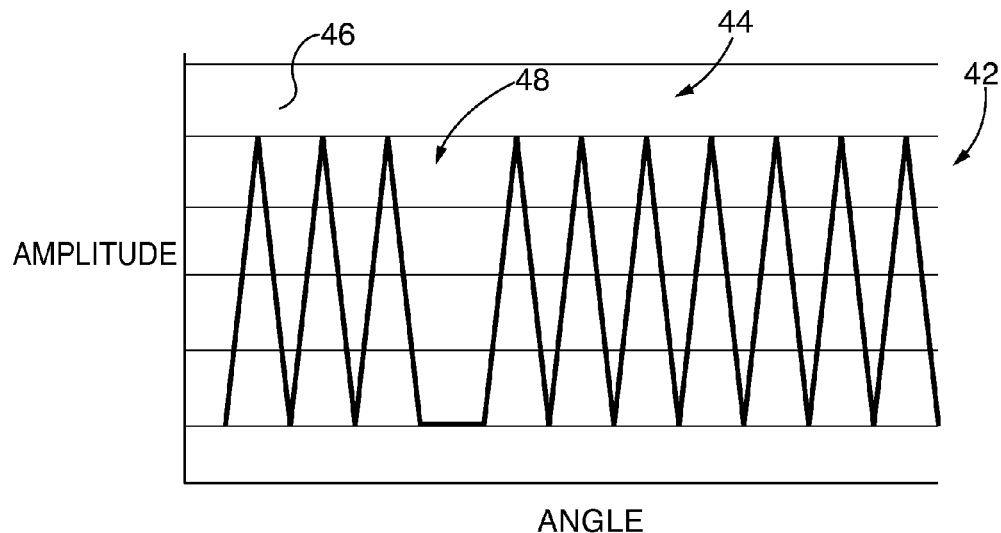
FIG. 3 depicts a graph of simulated blade movement sound amplitudes for an exemplar stage of the gas turbine during a turning gear operation in which adjoining blade assemblies are locked.

As previously described, pin migration may occur during a turning gear operation. In particular, at least one seal pin 32, 34 associated with at least one blade assembly 20 of the turbine section 16 may migrate from an associated pin slot 36, 38 and become undesirably wedged between adjoining platforms 28. When this occurs, movement of the adjoining blade assemblies 20 is inhibited and the adjoining blade assemblies 20 become immobilized, i.e. the blades assemblies 20 are locked. Therefore, a blade movement sound is not generated for two consecutive blade assemblies 20 during turning gear rotation. This is illustratively shown in FIG. 3, which depicts a graph 42 of simulated blade movement sound amplitudes 44 for an exemplary stage of a gas turbine 10 during a turning gear operation in which adjoining blade assemblies 20 are locked. Each peak 46 represents a simulated amplitude of a blade movement sound generated by each blade assembly 20 at approximately 12 o'clock. Region 48 of graph 42 indicates that no blade movement sounds are generated which corresponds to two consecutive blade assemblies being locked.

Figure 4:
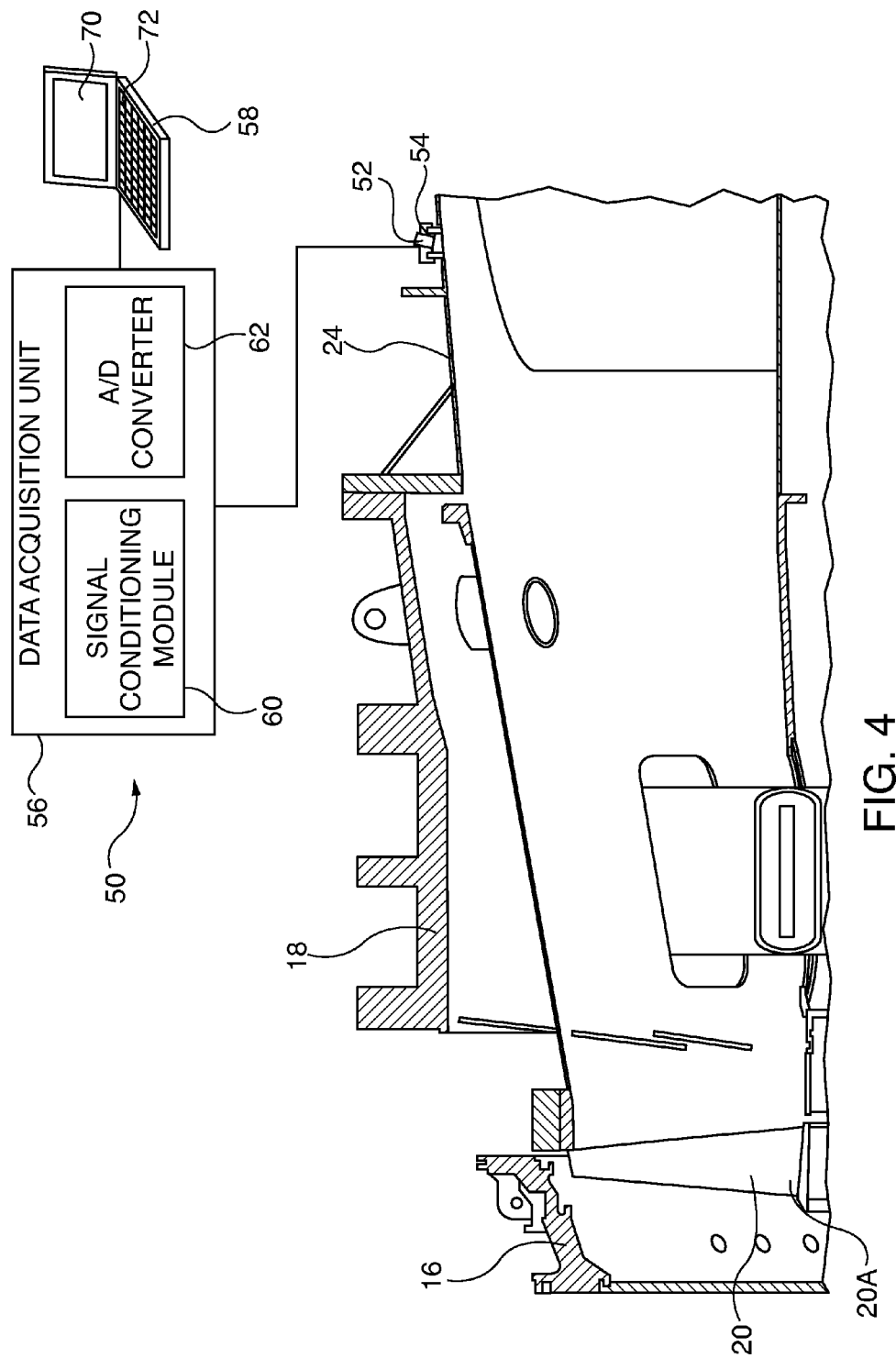
FIG. 4 is a schematic of an acoustic measurement system for detection of blade lockup of consecutive blade assemblies.

Referring to FIG. 4, an acoustic measurement system 50 for detection of blade lockup is shown. Although the current disclosure discusses blade lockup in a gas turbine, it is understood that the current disclosure is applicable to other types of turbine engines that experience blade lockup. The system 50 includes an acoustic sensor 52 such as a microphone that is mounted in an acoustic sensor housing 54. The housing 54 is mounted to a surface of the gas turbine 10 such as the outer diffuser 24 although it is understood that other surface locations may be used. Preferably, the location chosen for the acoustic sensor 52 minimizes the number of surfaces and other obstructions through which blade movement sound must travel in order to be detected by the acoustic sensor 52. In an embodiment, the acoustic sensor 52 is positioned to detect acoustic energy generated by a row of blade assemblies 20 located adjacent the exhaust cylinder section 18, such as the fourth row of blade assemblies 20 (i.e. row 4 blade assemblies 20A) of a four stage turbine section 16. In an alternate embodiment, a plurality of acoustic sensors 52 and associated sensor housings 54 may be used. For example, the acoustic sensors 52 and sensor housings 54 may be mounted in a circumferential and/or staggered arrangement around the outer diffuser 24. The system 50 also includes a known data acquisition (i.e. DAQ) unit 56 that is connected by wires or wirelessly connected between the acoustic sensor 52 and a general purpose computer 58. The DAQ unit 56 includes a signal conditioning module 60 for manipulating an analog signal generated by the acoustic sensor 52 into a form that is suitable for input to an analog to digital (A/D) converter 62. By way of example, the DAQ unit 56 may be a commercially available unit such as that sold by Experimental Design & Analysis Solutions, Inc. (EDAS) located in Spring Hill, Tenn.

Figure 5:
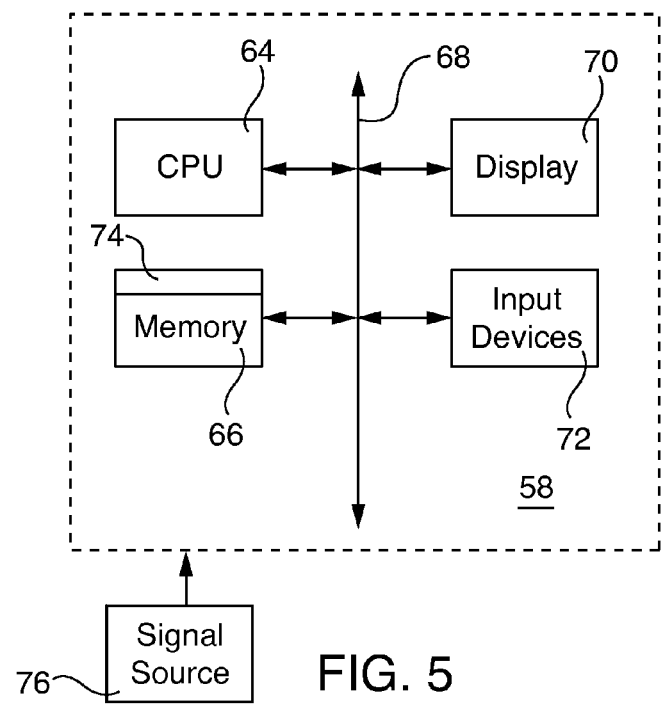
FIG. 5 is a block diagram of a computer.

The A/D converter 62 then transmits a digital signal to the computer 58. The computer 58 includes software and drivers for controlling operation of the DAQ unit 56 and is used to process, visualize and store measurement data. The computer 58 may use well-known computer processors, memory units, storage devices, computer software, and other components. A high level block diagram of such a computer is illustrated in FIG. 5. Computer 58 may include a central processing unit (CPU) 64, a memory 66 and an input/output (I/O) interface 68. The computer 58 is generally coupled through the I/O interface 68 to a display 70 for visualization and various input devices 72 that enable user interaction with the computer 58 such as a keyboard, keypad, touchpad, touchscreen, mouse, speakers, buttons or any combination thereof. Support circuits may include circuits such as cache, power supplies, clock circuits, and a communications bus. The memory 66 may include random access memory (RAM), read only memory (ROM), disk drive, tape drive, etc., or a combination thereof. Embodiments of the present disclosure may be implemented as a routine 74 that is stored in memory 66 and executed by the CPU 64 to process the signal from a signal source 76. As such, the computer 58 is a general purpose computer system that becomes a specific purpose computer system when executing the routine 74. The computer 58 can communicate with one or more networks such as a local area network (LAN), a general wide area network (WAN), and/or a public network (e.g., the Internet) via a network adapter. One skilled in the art will recognize that an implementation of an actual computer could contain other components as well, and that FIG. 5 is a high level representation of some of the components of such a computer for illustrative purposes.

The computer 58 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device. Examples of well-known computing systems, environments, and/or configurations that may be suitable for use with computer 58 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

It is to be understood that exemplary embodiments of the present disclosure may be implemented in various forms of hardware, software, firmware, special purpose processors, or a combination thereof. In one embodiment, aspects of the current disclosure may be implemented in software as an application program tangibly embodied on a computer readable storage medium or computer program product. As such, the application program is embodied on a non-transitory tangible media. The application program may be uploaded to, and executed by, a processor comprising any suitable architecture.

Figure 6:
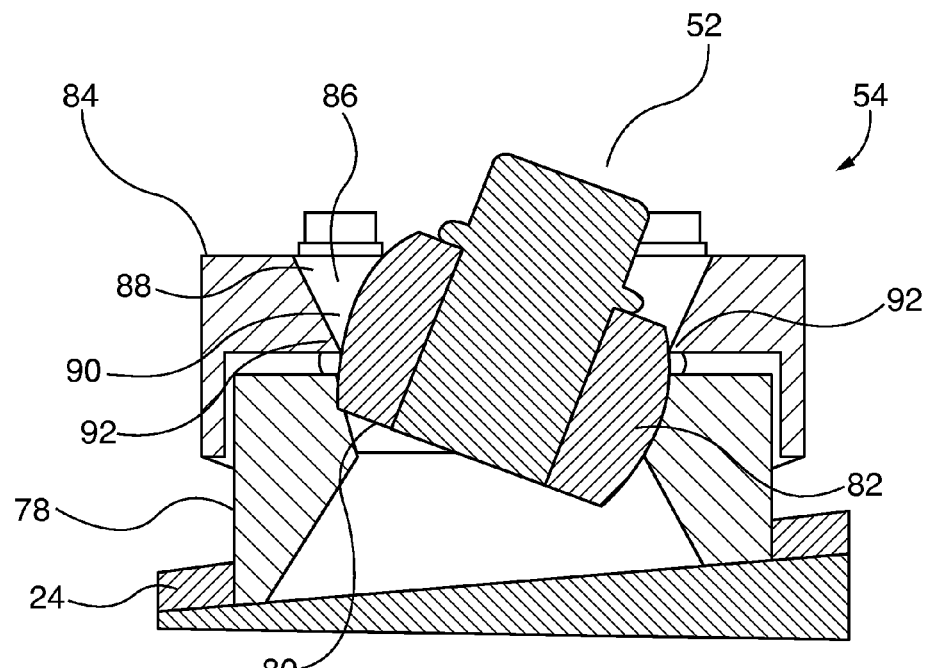
FIG. 6 is a cross sectional view of an acoustic sensor housing.

Referring to FIG. 6, a cross sectional view of the housing 54 is shown. The housing 54 includes a base 78 that may be removably attached to the outer diffuser 24. The base 78 includes a spherically shaped aperture or socket 80 for receiving a spherically shaped sensor holder 82 that includes the acoustic sensor 52. The holder 82 and socket 80 are configured such that the holder 82 is rotatable in the socket 80 about a common center and within a conical volume to form a ball and socket joint. This enables a user to adjust an orientation of the acoustic sensor 52 to enhance the ability to detect blade movement sounds. The housing 54 further includes a retainer 84 that is mounted to the base 78. The acoustic sensor 52 extends through a hole 86 formed in the retainer. An upper portion 88 of the hole 86 is sized larger than a lower portion 90 to form a tapered hole 86. The upper portion 88 is sized to enable unobstructed rotation of the acoustic sensor 52. The lower portion 90 is sized smaller than a largest size of the holder 82 and includes an edge 92 that captures the holder 82. It is understood that other types of rotatable joints may be used to rotate the holder 84.

Figure 7:
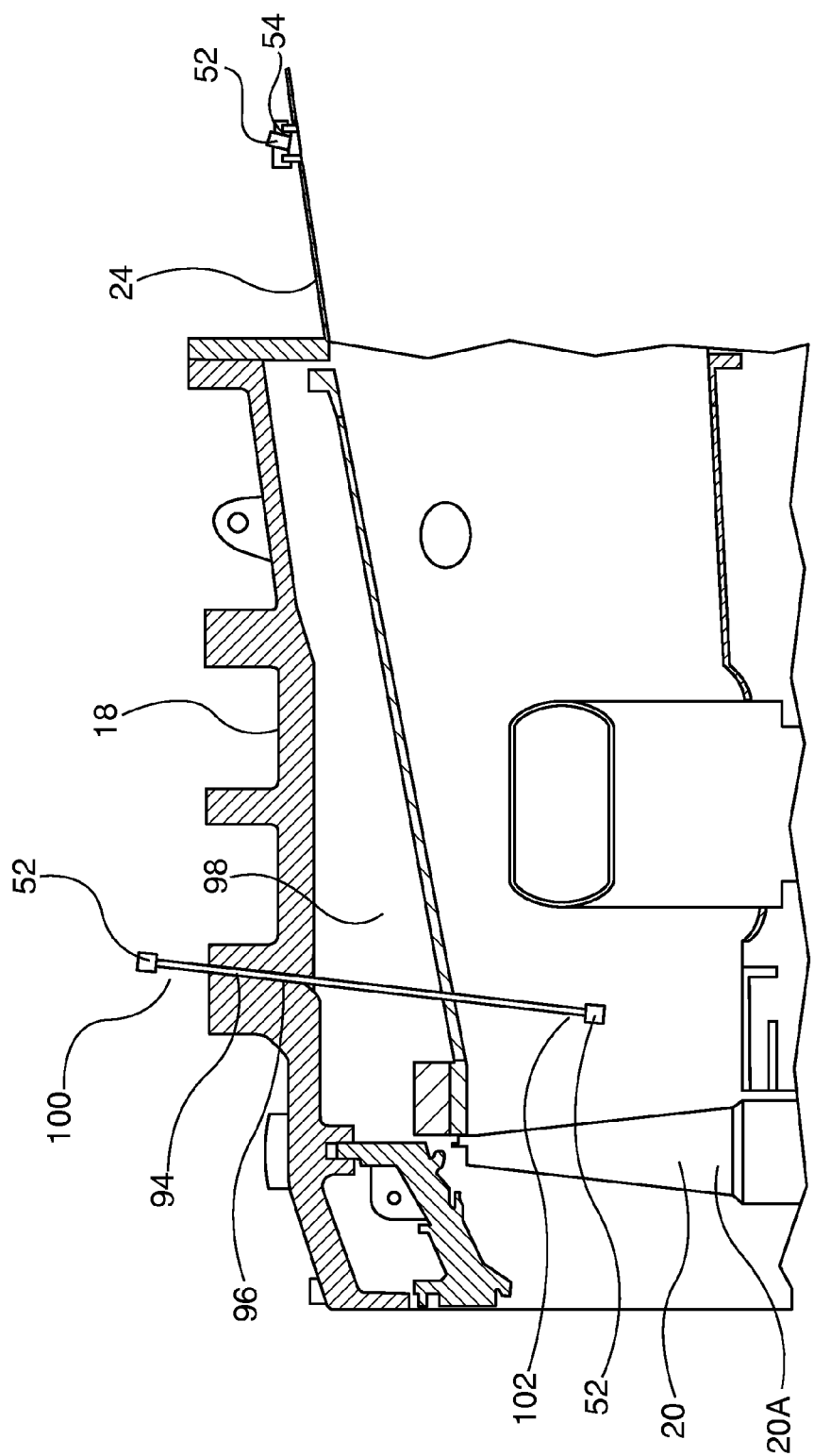
FIG. 7 is a partial cross sectional view of an exhaust cylinder section of the gas turbine.

Referring to FIG. 7, a section of the gas turbine 10, such as the exhaust cylinder section 18, may include at least one thermocouple in order to monitor exhaust temperature of the gas turbine 10 during operation. The thermocouple is typically inserted in a thermocouple port 94 which includes a long hollow tube 96 that extends from outside the exhaust cylinder section 18 and into a cavity 98 of the exhaust cylinder section 18 and proximate the blade assemblies 20A, for example. In an alternate embodiment, an acoustic sensor 52 may be substituted for the thermocouple in the thermocouple port 94 in order to detect blade assembly movement sounds. For example, the acoustic sensor 52 may be located in either a top 100 or bottom 102 portion of the thermocouple port 94. In an alternate embodiment, both an acoustic sensor 52 located on the outer diffuser 24 and an acoustic sensor 52 in the thermocouple port 94 may be used to detect blade assembly movement sounds.

Test Results

Figure 8:
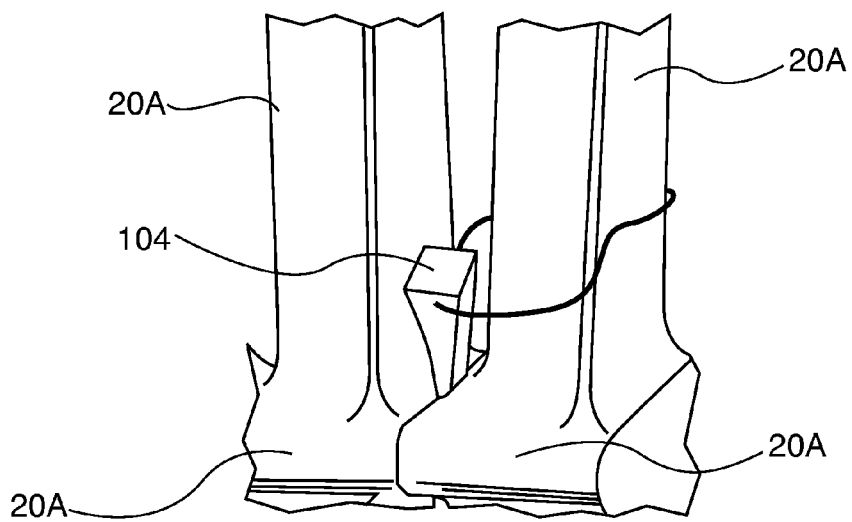
FIG. 8 depicts the insertion of a wooden wedge between adjoining platforms of a blade assembly.

A test was performed in order to confirm that the system 50 is able to detect a blade movement sound generated by each blade assembly 20 when rotating at turning gear speed. Four acoustic sensors 52 were positioned in the exhaust of a gas turbine 10 and a DAQ unit 52 was setup to record acoustic signals due to movement of the blade assemblies 20A of the turbine section 16. Initially, a fifteen minute baseline recording was performed with the blade assemblies 20A rotating at turning gear speed. In particular, the baseline recording included all the acoustic signals generated in the gas turbine 10 thus including a blade movement sound generated by each blade assembly 20A. Next, two consecutive blade assemblies 20A were immobilized by inserting a wooden wedge 104 between adjoining platforms 28 (see FIG. 8) in order to simulate a seal pin 32, 34 that had migrated and immobilized adjoining platforms 28. A fifteen minute "blade wedging" recording of the acoustic signals was then performed with the blade assemblies 20A rotating at turning gear speed. In addition, a once per rotation signal was recorded.

Due to the acoustic characteristics of the gas turbine 10, irregular timing and amplitude of each blade movement sound, signal to noise ratio and other factors, it was difficult to distinguish the acoustic signals corresponding to blade movement sounds generated by the blade assemblies 20A from the background noise generated in the gas turbine 10. In order to more clearly detect blade movement sounds, a narrowed frequency range was selected based on the largest acoustic signals detected and the associated frequency. In particular, a narrowed frequency range of approximately 0.9 kHz to 10 kHz was used to filter the raw data.

Figure 9:
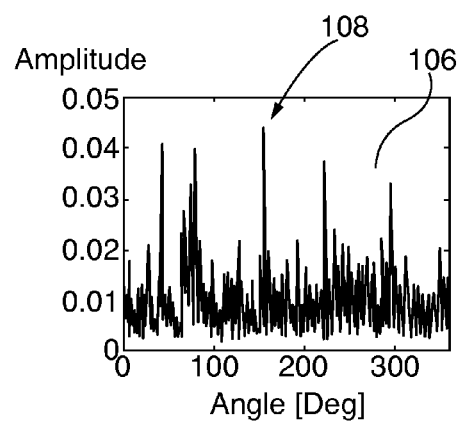
FIG. 9 depicts a chart of amplitudes of all the acoustic energy generated in the gas turbine in the narrowed frequency range and without a wedge inserted between a pair of platforms.
Figure 10:
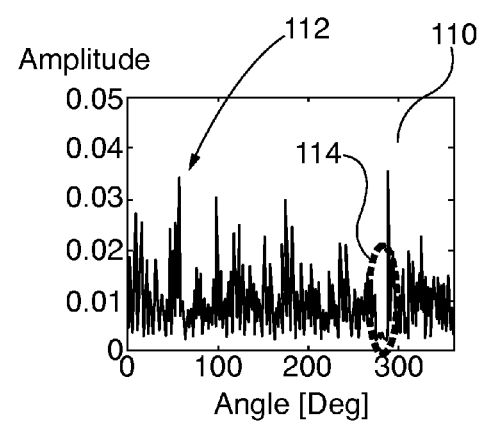
FIG. 10 depicts a chart of amplitudes of the acoustic energy generated in the gas turbine in the narrowed frequency range with a wedge inserted between adjoining platforms.

FIGS. 9-10 illustrate the detection of wedged blade assemblies. FIG. 9 depicts a chart 106 of amplitudes 108 of all the acoustic energy generated in the gas turbine 10 in the narrowed frequency range, without the wedge 104 inserted between a pair of platforms 28, relative to an angle of rotation of the blade assemblies 20A. Thus, the chart 106 includes the blade movement sound of each blade assembly 20A. The amplitudes in chart 106 were obtained during three rotations at turning gear speed. FIG. 10 is a chart 110 of the amplitudes 112 of the acoustic energy with the wedge 104 inserted between adjoining platforms 28. Chart 110 depicts a relatively low acoustic energy amplitude in region 114 between approximately 280 and 290 degrees as compared to a corresponding region in FIG. 9, thus indicating that two consecutive blade assemblies 20A are locked.

Figure 11:
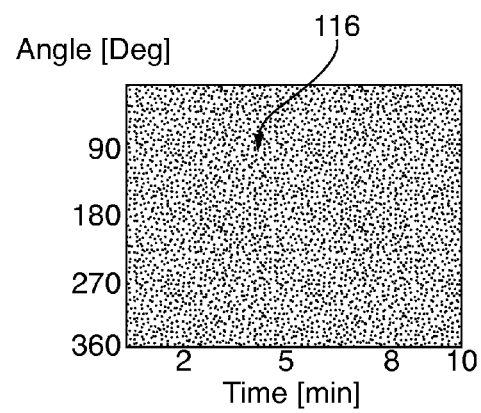
FIG. 11 depicts amplitude values for angles of rotation of the blade assemblies, when rotating at turning gear speed, relative to time for all the acoustic energy generated in the gas turbine and without a wedge inserted between a pair of platforms.
Figure 12:
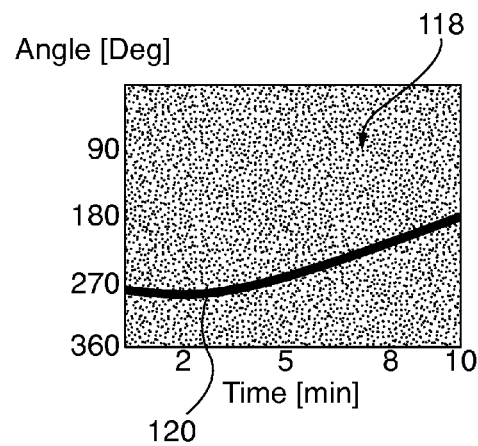
FIG. 12 depicts amplitude values for angles of rotation of the blade assemblies, when rotating at turning gear speed, relative to time for the acoustic energy generated in the gas turbine with a wedge inserted between adjoining platforms.

FIGS. 11-12 illustrate the effect of wedged blade assemblies over time. FIG. 11 shows amplitude values 116 for angles of rotation of blade assemblies 20A, when rotating at turning gear speed, relative to time for all the acoustic energy generated in the gas turbine 10 and without the wedge 104 inserted between a pair of platforms 28. Thus, FIG. 11 includes the amplitude value 116 of each blade movement sound of each blade assembly 20A. FIG. 12 shows amplitude values 118 for the acoustic energy with the wedge 104 inserted between adjoining platforms 28. Curve 120, on the other hand, depicts an absence of amplitude values 118, thus indicating that two consecutive blades 20A are locked. The curve 120 is not a straight line since the turning gear speed varies between approximately 3 to 5 rpm. It is noted that a curve indicating an absence of amplitude values is generated for each pair of consecutive locked blade assemblies 20A.

Aspects of the current disclosure may be used during a turning gear operation in order to indicate that a seal pin 32, 34 has become wedged between a pair of blade assemblies 20. A visual inspection of the turning blade assemblies 20 may then be conducted. This significantly reduces inspection time relative to the current process that is being used. In addition, the system 50 may be installed at a customer site at minimal cost.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An acoustic measurement system for detecting locked blade assemblies in a gas turbine having a plurality of blade assemblies, comprising:
    at least one acoustic sensor for detecting acoustic energy generated as a result of movement of the blade assemblies;
    a sensor housing for holding the acoustic sensor, wherein the housing includes a rotatable joint for enabling rotation of the acoustic sensor; and
    a data acquisition unit that detects an absence of acoustic energy wherein the absence of acoustic energy is indicative of locked blade assemblies.

2. The system according to claim 1, wherein the blade assemblies are consecutive and are locked due to wedging of a sealing pin between the blade assemblies.

3. The system according to claim 1, wherein the blade assemblies generate a blade movement sound.

4. The system according to claim 1, wherein the acoustic energy is detected in a frequency range of approximately 0.9 kHz to 10 kHz.

5. The system according to claim 1, wherein the housing includes a rotatable sensor holder and a base, wherein the sensor holder includes the acoustic sensor.

6. The system according to claim 5, wherein the rotatable joint is a ball and socket joint.

7. The system according to claim 5, wherein the base is removably attachable to a surface of the gas turbine and includes a spherically shaped aperture for receiving the sensor holder, and wherein the sensor holder is rotatable in the aperture about a common center and within a conical volume to form the rotatable joint.

8. The system according to claim 1, wherein the acoustic sensor is a microphone.

9. An acoustic measurement system for detecting locked blade assemblies in a gas turbine having a plurality of blade assemblies and an outer diffuser, comprising:
    at least one acoustic sensor for detecting acoustic energy generated as a result of movement of the blade assemblies during a turning gear operation;
    a sensor housing for holding the acoustic sensor, wherein the housing is mounted to the outer diffuser and includes a rotatable joint for enabling rotation of the acoustic sensor; and
    a data acquisition unit that detects an absence of acoustic energy wherein the absence of acoustic energy is indicative of locked blade assemblies.

10. The system according to claim 9, wherein the blade assemblies are consecutive and are locked due to wedging of a sealing pin between the blade assemblies.

11. The system according to claim 9, wherein the blade assemblies generate a blade movement sound.

12. The system according to claim 9, wherein the acoustic energy is detected in a frequency range of approximately 0.9 kHz to 10 kHz.

13. The system according to claim 9, wherein the housing includes a rotatable sensor holder and a base, wherein the sensor holder includes the acoustic sensor.

14. The system according to claim 13, wherein the rotatable joint is a ball and socket joint.

15. The system according to claim 13, wherein the base is removably mounted to the outer diffuser and includes a spherically shaped socket for receiving the sensor holder, and wherein the sensor holder is rotatable in the socket about a common center and within a conical volume to form the rotatable joint.

16. The system according to claim 9, wherein the acoustic sensor is a microphone.

17. A method for detecting locked blade assemblies in a gas turbine having a plurality of blade assemblies arranged in at least one row, comprising;
    providing at least one acoustic sensor proximate a row of blade assemblies wherein each blade assembly in the row moves during a turning gear operation and generates a corresponding acoustic signature;
    rotating the acoustic sensor to enable detection of the acoustic energy; and
    detecting an absence of an acoustic signature of at least one blade assembly wherein the absence is indicative of locked blade assemblies.

18. The method according to claim 17, wherein the blade assemblies are consecutive and are locked due to wedging of a sealing pin between the blade assemblies.

19. The method according to claim 17, wherein the blade assemblies generate a blade movement sound.

20. The method according to claim 17, wherein the acoustic energy is detected in a frequency range of approximately 0.9 kHz to 10 kHz.

* * * * *